United States Patent [19]

Rubinstein

[11] Patent Number: 4,914,711
[45] Date of Patent: Apr. 3, 1990

[54] INTEGRALLY MOLDED BEARING BLOCK ASSEMBLY

[75] Inventor: Leon Rubinstein, Natick, Mass.

[73] Assignee: Polaroid Corporation, Cambridge, Mass.

[21] Appl. No.: 496,235

[22] Filed: May 19, 1983

Related U.S. Application Data

[63] Continuation of Ser. No. 285,976, Jul. 23, 1981, abandoned.

[51] Int. Cl.⁴ ................ F16C 13/00; B32B 23/00; G03B 9/00
[52] U.S. Cl. .................... 384/419; 264/242; 354/304; 384/26
[58] Field of Search .......... 308/3 R, 3 A, 3 B, 5 R, 308/3.6, DIG. 7, DIG. 8, DIG. 9, 178; 384/419, 418, 7, 26, 41; 264/242; 354/304

[56] References Cited

U.S. PATENT DOCUMENTS

| 719,739 | 2/1903 | Burge et al. | 308/3 R |
|---|---|---|---|
| 2,092,994 | 9/1937 | Vogt | 138/94.3 |
| 2,577,350 | 12/1951 | Morin | 264/242 |
| 2,961,770 | 6/1976 | Wrasman | 251/315 |
| 3,187,072 | 6/1965 | Morin | 264/242 |
| 3,206,992 | 9/1965 | Ferdig | 474/174 |
| 3,591,669 | 7/1971 | Memory | 264/101 |
| 3,673,672 | 7/1972 | Iten | 29/443 |
| 3,785,217 | 1/1974 | Peura | 74/230.3 |
| 3,882,518 | 5/1975 | Douglas | 354/301 |
| 4,093,956 | 6/1978 | Goto | 354/86 |
| 4,253,757 | 3/1981 | Friedman et al. | 354/304 |

FOREIGN PATENT DOCUMENTS

2057592 4/1981 United Kingdom ............... 308/178

Primary Examiner—Thomas R. Hannon
Attorney, Agent, or Firm—David R. Thornton; Alfred E. Corrigan

[57] ABSTRACT

The assembly of a support and a slide carried by the support for translational movement relative thereto in which the support defines a slide opening having opposed end edges and opposed side edges, the side edges diverging from each other proceeding from one of said end edges toward the other of said end edges and defining guide means also so diverging, the slide having a pair of side edge formations complementing the guide formations and being of a length less than the distance between the end edges of the slide opening so that upon movement away from the one end edge of the slide opening, a sliding clearance develops between the edge formations of the slide and the guide formations in the opening. The assembly is formed by a two shot molding process in which the plate assembly is first formed using a plastic material having a relatively high melting temperature, enclosing the preformed support in a mold to define a cavity for the slide, such cavity including the side edges of the slide opening in the support, and then injecting a second plastic material of relatively low melting temperatures into the mold cavity to form the slide. The assembly is particularly useful in providing end supporting subassemblies in spread roller assemblies used for processing exposed film units in instant cameras. Both the support and the slide are preferably formed glass filled plastic materials for meeting required strength and minimal molding shrinkage.

12 Claims, 4 Drawing Sheets

INTEGRALLY MOLDED BEARING BLOCK ASSEMBLY

BACKGROUND OF THE INVENTION

This invention relates to a method for molding multi-part assemblies and to products formed by such methods. More particularly, it concerns a method for molding support assemblies for spread rollers of photographic cameras and similar apparatus in which one of two rollers is journalled at each end in a support plate while the other of the two rollers is journalled at each end in a movable, spring-loaded bearing block slidable in the support plate. The method involves a two-shot molding technique by which the slidable bearing block is molded in place using the sliding guide surfaces of the support plate as a partial mold cavity.

In a commonly assigned U.S. Pat. No. 4,253,757 issued Mar. 3, 1981 to Harvey S. Friedman and Leon Rubinstein, there is disclosed a spread roller assembly which is of a general class of such assemblies to the extent that it includes a pair of juxtaposed rollers adapted to be incorporated in the access door housing of a photographic camera and operative for spreading a processing fluid across a layer on an exposed film unit to initiate the formation of a visible photographic image in the film unit. In the patent disclosure, opposite ends of one of the two rollers, specifically the top roller, are journalled directly in a plate-like support member of molded plastic material. The molded support member is shaped to facilitate connection directly to the access door housing by snap fit, to provide a pivotal mounting of the access door housing from the camera body and to support various related components such as a door latch and the like. The bottom roller is journalled at each end in a movable bearing block also formed of molded plastic material and adapted to be assembled with and slidably received in the support member for relative vertical movement. The movable bearing blocks are each biased upwardly by a coil spring acting between it and the support member. The movable bearing block is further configured to define a forwardly curved film engaging formation which though moved out of physical engagement with the film unit passing through the rollers as a result of downward displacement of the bottom roller by the thickness of the film unit, moves upwardly to engage the film unit as the trailing end thereof exits from the nip of the two rollers.

The spread roller support arrangement disclosed in the aforementioned patent has been demonstrated to be advantageous not only from the standpoint of providing improved spread roller performance in processing film units exposed in instant cameras as compared with prior arrangements, but more significantly from the standpoint of greatly reduced material and manufacturing costs. In this latter respect, the formation of the plate-like support members and movable bearing blocks from molded plastics and the facility provided for the use of simple low-cost coil springs to develop the needed nip pressure between the rollers result in important cost savings by comparison to prior extensive use of stamped metal for both the roller supports and in specially fabricated leaf springs. Nevertheless, the requirement for assembly of individually formed parts remains as an increment of manufacturing cost of substantial magnitude in light of the large numbers of spread roller assemblies used in the instant camera art. Accordingly, there is need for improvement in spread roller assemblies of the type disclosed in the aforementioned patent, particularly in reducing the time required for the assembly of each unit.

SUMMARY OF THE INVENTION

In accordance with the present invention, the assembly of a support and a slide carried by and for translational movement relative to the support, the support and slide corresponding respectively to the plate-like support member and movable bearing block of the roller support in a spread roller assembly of the type mentioned, is formed by injecting a first plastic material into a mold cavity to form the support in a configuration defining a slide opening having opposed side and end edges, respectively, and a pair of guides extending along the side edges from one of the end edges and diverging in the direction of the other of the end edges. The support is then enclosed in a mold shaped to complement the support and also to define with at least the guides and one of the end edges of the slide opening, a second mold cavity having a length less than the distance between the end edges of the slide opening. A second plastic material is then injected into the second mold cavity to form the slide. The first plastic material from which the support is formed is preferably a glass filled polyester having a relatively high melting temperature, for example 500° F., whereas the second plastic material is preferably a glass filled acetal having a lower melting temperature, for example 400° F. By injecting the polyester at temperatures at or only slightly above its melting pressure but under relatively high injection pressures, solidification of the injected material in the first mold occurs substantially instantaneously so that the first and second molding operations can be carried out in rapid succession. By injecting the acetal at a temperature substantially above its melting point and at low injection pressures, distortion in the preformed support is minimized. Additionally, provision is made for mold reinforcement of the preformed support to minimize further any deformation that may occur upon injecting the second plastic material to form the slide.

In the resulting roller support assembly, the guides of the opening in the support member are defined as trapezoidal rails having a base smaller than the thickness of the side edges of the opening and result in complementary grooves along the side edges of the slides. The rate at which the guide rails diverge is correlated to the depth thereof so that the innermost edges of the guide rails are spaced less than the maximum distance between the slide opening edges. The divergence of the rails insures a parting of the slide from the guide rails in which it was molded and facilitates subsequent translational movement of the slide within the opening.

To facilitate formation of a forwardly curved film engaging formation directly on the slide, the support is configured to define a planar mold surface at right angles to the edges of the slide opening. Also, the slide end supports are formed with spring receiving formations in the nature of recesses which, in the molding process facilitate mold gating so that the second plastic is injected to engage steel mold surfaces prior to coming in contact with surfaces of the previously formed support.

Among the objects of the present invention, therefore, are the provision of an improved method for molding the assembly of a support and a slide of general application; the provision of such a method for making the roller support subassembly of a spread roller assembly used in instant cameras; and the provision of an improved roller support subassembly for such spread roller assemblies which facilitates low-cost manufacture using the method of the invention.

Other objects and further scope of applicability of the present invention will become apparent from the detailed description to follow taken in conjunction with the accompanying drawings in which like parts are designated by like reference numerals.

BRIEF DESCRIPTION OF THE DRAWINGS

FIG. 1 is a perspective view illustrating the working components of a spread roller assembly for use in instant cameras and the like;

FIG. 3 is an exploded fragmentary perspective view illustrating mold fragments for forming the slide of the present invention;

DETAILED DESCRIPTION OF THE PREFERRED EMBODIMENT

Figures 1, 3:
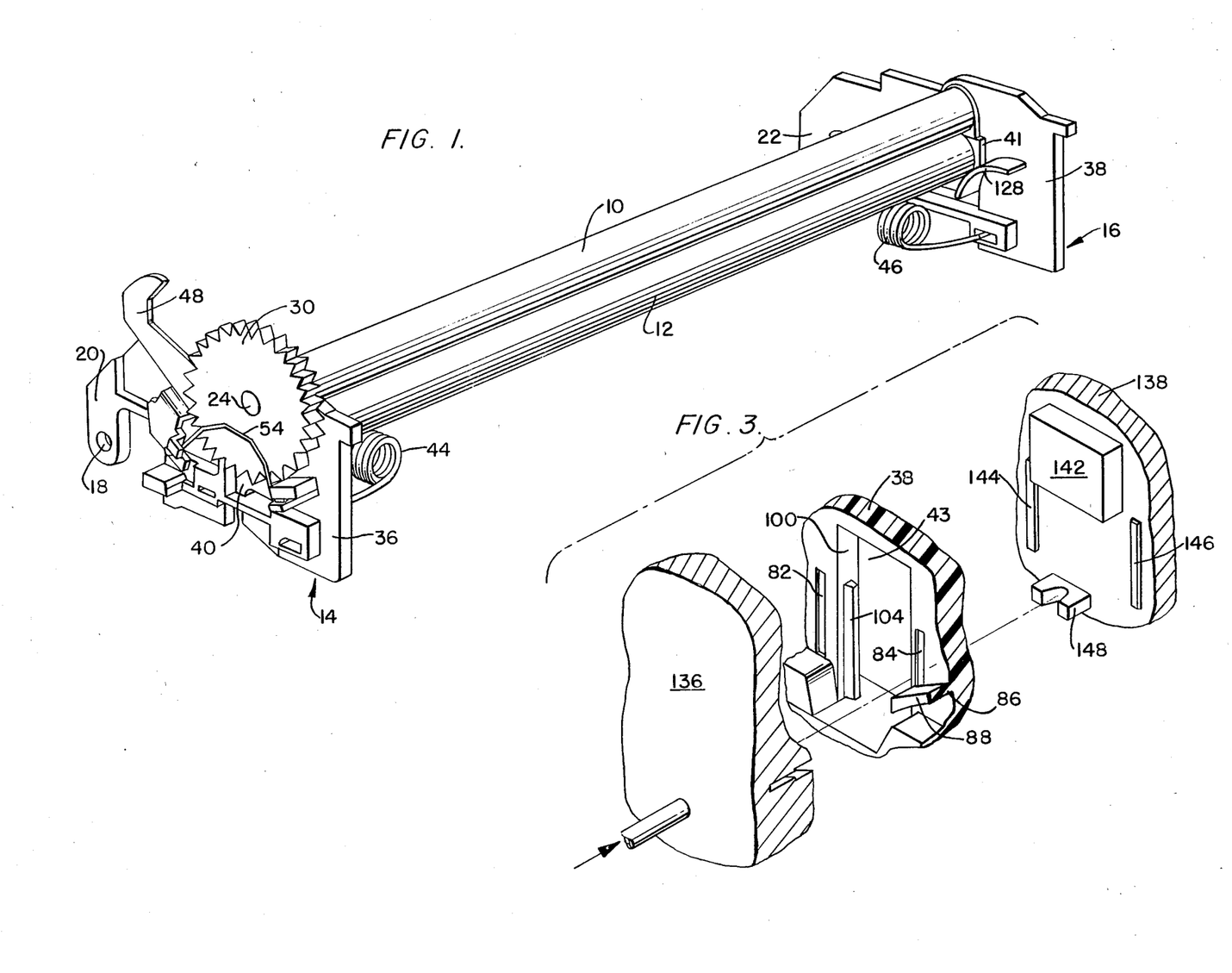

In FIG. 1 of the drawings, the major working components of a spread roller assembly of the type used in instant cameras to process exposed film units and eject them from the body of such a camera include a pair of juxtaposed elongated rollers 10 and 12 rotatably carried at opposite ends by support assemblies 14 and 16. As described fully in the aforementioned U.S. Pat. No. 4,253,757, the components illustrated in FIG. 1 are adapted to be mounted in a film chamber access door housing (not shown) which is pivotal from the camera housing (also not shown) on an axis defined by a pair of aligned apertures 18 formed in rearwardly and downwardly extending arms 20 and 22 on each of the support assemblies 14 and 16, respectively. Also as described in the aforementioned U.S. patent, each of the rollers 10 and 12 are formed, respectively, with journal shafts 24 and 26 at opposite ends. As shown most clearly in FIG. 2, the journal shaft 24 of the top roller 10 extends through a bearing aperture 28 to be coupled at its outer end with a double spur gear 30. The journal shaft 26 on the bottom roller 12 extends through a similar bearing aperture 32 to be connected with a relatively small pinion gear 34 which meshes with the double gear so that as the latter is driven by a gear train (not shown), both rollers 10 and 12 will be rotated in opposite directions of rotation in the performance of their film processing function. The ends of the rollers 10 and 12 opposite from that shown in FIG. 2 are similarly journalled in the support assembly 16 but without the gears 30 and 34 which are provided at only one end of the rollers.

Because the spread roller assembly including the components shown in FIG. 1 may be characterized as having a "gear side" and a "non-gear side" and because the support assemblies 14 and 16 differ from each other only in the sense that the support assembly 14 is designed to cooperate with additional components not related to the support of the rollers 10 and 12, the support assemblies 14 and 16 will be referred to hereinafter as the "gear side" support assembly and the "non-gear side" support assembly, respectively.

The support assemblies 14 and 16 include, respectively, a plate-like support member 36 and 38 in which the bearing apertures 28 for supporting the top roller are located, and a slide or slidable bearing blocks 40 and 41 in which the bearing apertures 32 for supporting the bottom roller 12 are located. Each of the support members or plates 36 and 38 are formed with a slide opening or window 42 (FIG. 2) and 43 (FIG. 8) in which the bearing blocks 40 and 41 are respectively slidably mounted in a manner to be described in detail below. Also, the respective bearing blocks 40 and 41 are biased upwardly in each support assembly by coil springs 44 and 46 to develop nip pressure between the rollers 10 and 12. The support assembly 14 additionally carries a latch 48 having a slotted pivot aperture 50 adapted to be received over a pivot lug 52 formed in the support member 36. A bow-shaped latch spring 54 is engaged at opposite ends between a tang 56 on the latch 48 and a lug 58 projecting from the outboard side of the support member 36. The latch 48 and the bow spring 54 are well known in the art and though differing in structure from the latch structure illustrated in the aforementioned U.S. Pat. No. 4,253,757 are disclosed in other U.S. patents including those referred to in the specification of that patent. From the standpoint of the present invention, therefore, such components as the latch 48 and the bow spring 54 are shown only to identify structure included in the support assembly 14 for accommodating the latch of the door housing (not shown) in which the complete assembly shown in FIG. 1 is used. Also it will be noted in this respect, that the pivot lug 52 on the support member 36 is located in a recessed flat 60 defined at its front edge by vertical flange 62 which functions as a stop to limit opening or counterclockwise movement of the latch against the bias of the spring 54. A projecting stop lug 64 is positioned on the support member 36 to be engaged by an arm 66 on the latch 48 and thus limit pivotal movement of the latch in a clockwise direction or in the direction of pivotal bias by the bow spring 54.

Figure 2:
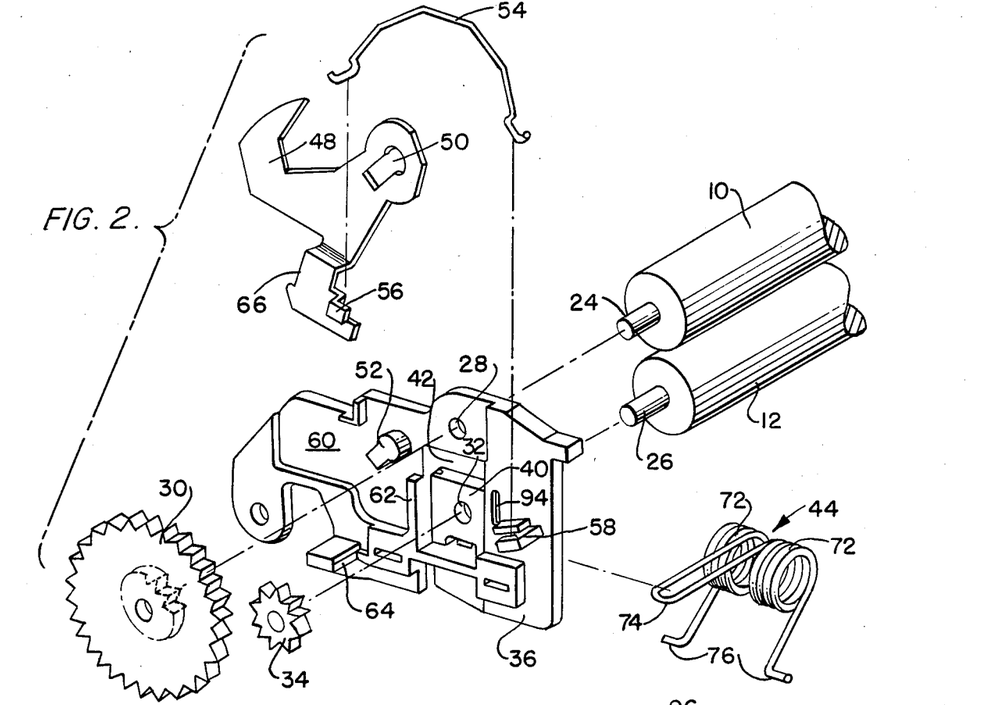
FIG. 2 is an exploded fragmentary perspective view illustrating one end of the assembly shown in FIG. 1.

The opposite side of the support plate 36 from the side visible in FIG. 2, or the inboard side of the support plate 36, is a mirror image of the inboard side of the support member or plate 38 on the non-gear side of the support assembly 16. The inboard side of the support plate 38 is shown most clearly in FIG. 8 to include a rectangular boss 68 (above the slide window 43) through which the bearing aperture 28 opens. A spring mounting boss formation 70 is located at the bottom of the window 43. In this context and as shown most clearly in FIG. 2, each of the springs 44 and 46 includes two axially spaced coils 72 joined at their inner ends by a central bight-shaped leg 74 and ending at their outer ends as a pair of L-shaped legs 76. As shown in phantom lines in FIG. 8, the boss formation 70 defines a pair of undercut recesses 78 for receiving the ends of the L-shaped legs 76 of the springs, in this instance of the spring 46. The bight-shaped central legs 74 are stressed to engage the bottom of the bearing blocks 40 and 41 in a manner described in the aforementioned U.S. Pat. No. 4,253,757. Also as disclosed in that patent, a cantilevered latch spring 80 is included on the bottom of both plates 36 and 38 for retention of the assemblies 14 and 16 in the access door housing (not shown).

In addition to the aforementioned functioning formations presented on the inboard sides of each of the support plates 36 and 38, a pair of generally rectangular, vertically oriented mold retention recesses 82 and 84 are spaced from the edges of the slide window 43. The retention recess 84 is foreshortened at its lower end by an arc-shaped projection 86 which defines a mold flat 88 adjacent the window 43 and spaced inwardly from the general plane of the support plate inboard surface (see FIG. 13) for reasons which will be made apparent in the description to follow below.

Figures 9, 10:
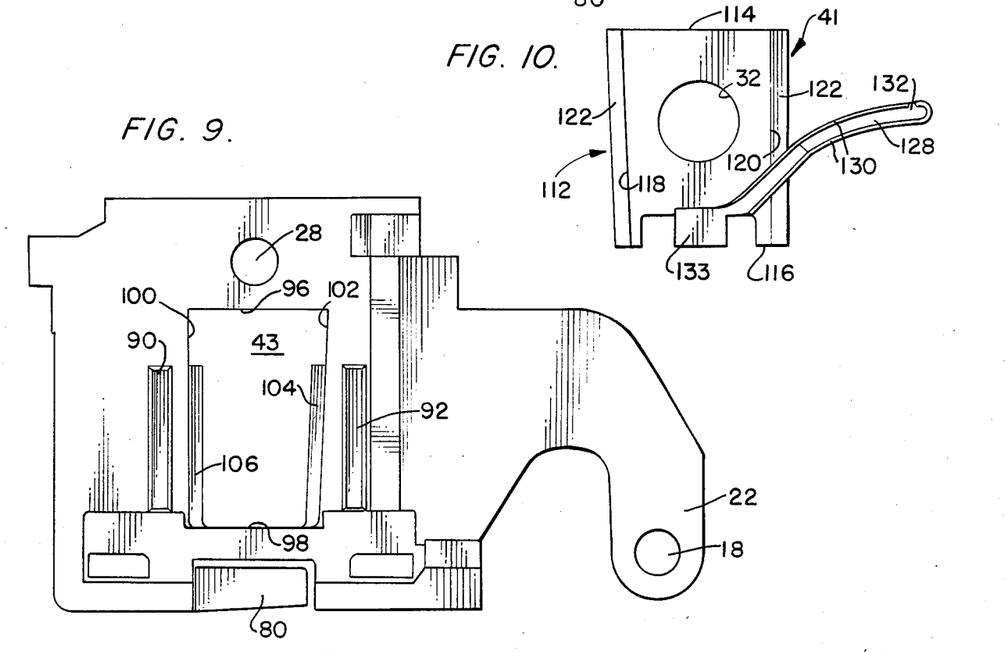
FIG. 9 is a side elevation showing the opposite side of the plate illustrated in FIG. 8.
FIG. 10 is a front elevation illustrating a sliding bearing block of the invention.
Figure 13:
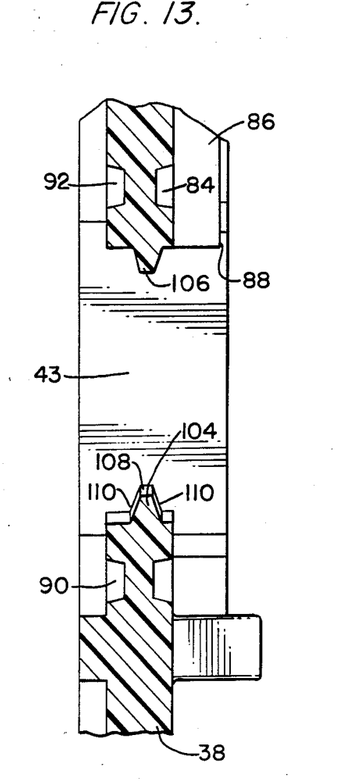
FIG. 13 is an enlarged fragmentary cross-section on line 13—13 of FIG. 8.
Figure 14:
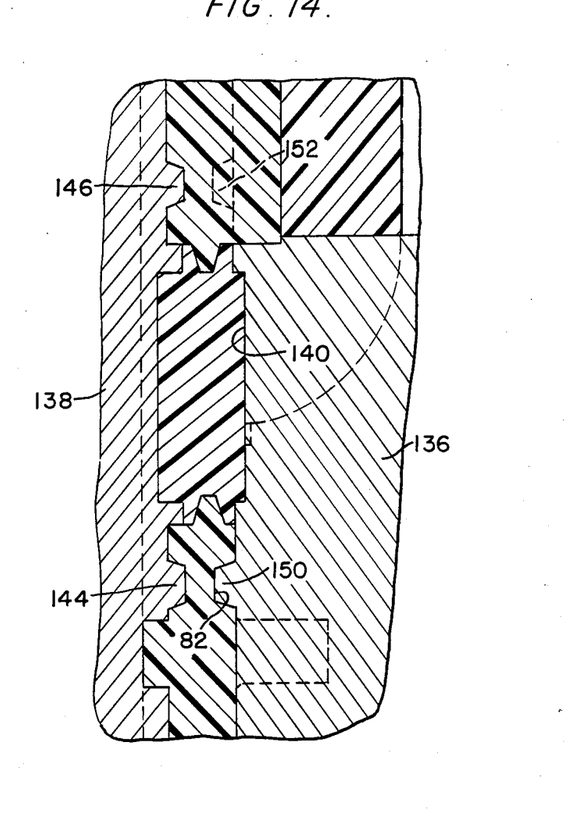
FIG. 14 is an enlarged cross-section on line 14—14 of FIG. 8 and illustrating fragments of mold components by which the parts shown in FIGS. 8-12 are formed.

The outboard side of the support plate 38 of the non-gear side of the assembly 16 differs from the outboard surface of the support plate 36 principally in the omission of formations needed in the plate 36 to accommodate the latch 48 and spring 54. Thus as shown in FIGS. 9 and 13, the outboard surface of the plate 38 of the present invention is characterized as including an additional pair of rectangular, vertically oriented mold retention recesses 90 and 92. Although the comparable outboard surface of the support plate 36 on the gear-side of the support assembly 14 differs slightly from that shown in FIG. 9, it will be noted that a mold retention recess 94 (FIG. 2) is provided on the opposite side of the slide window 42 from the stop flange 62.

The configuration of the slide windows 42 and 43 and related structural formations by which the bearing blocks 40 and 41 are retained therein may be understood by reference to FIGS. 4-7 of the drawings. As shown in these figures, each of the windows 42 and 43 is of a trapezoidal configuration to define a pair of parallel end edges 96 and 98 and a pair of linear side edges 100 and 102 which diverge in a direction proceeding from the end edge 98 toward the end edge 96. In the illustrated embodiment, the divergence of the side edges 100 and 102 is achieved by an inclination in the side edge 100 at an angle A perpendicular to both end edges 96 and 98. The opposite side edge 102 in the illustrated embodiment is perpendicular to both end edges 96 and 98. It is contemplated, however, that either or both of the side edges 100 and 102 may be inclined with respect to the other to achieve the divergence of the side edges proceeding from the bottom end edge 98 to the top end edge 96.

To provide suitable clearance, the angle of divergence, angle A, is made, for example, 1 ⅛° to provide 0.003 inch clearance when the 0.350 inch long slide is moved to its working position adjoining the wide end of the opening. Hence, it should be understood that the width of the slide is made a very close fit, or that is, substantially equal in width to the width of the opening adjoining the narrow end of the latter. Then, in accordance with the angle A, when the slide is moved approximately 0.110 inch to its working position, proper clearance results.

Extending along each side edge 100 and 102 of the windows 42 and 43 is a guide rail 104 and 106, respectively, of trapezoidal cross-section to define a relatively narrow rail end surface 108 spaced from the base of the rail at the respective window side edges by converging rail side surfaces 110. The rails 104 and 106 extend from the short end edge 98 of each window upwardly along the side surfaces 102 and 104 to approximately ¾ of the length of the window between the end edges 96 and 98. Also it will be noted that the length of the rails 104 and 106 is equal to the length or height of the sliding bearing blocks 40 and 41.

In the preferred embodiment, the sides of the openings 42 and 43 carry the rails 104 and 106 while the sides or bearing blocks 40 and 41 carry complementary grooves 124 and 126 as explained in detail below with regard to FIGS. 10-12. However, it should be understood that the position of the rails and grooves can be reversed, and that the rails and grooves broadly define complementary side edge formations of the slide and opening.

Figure 4:
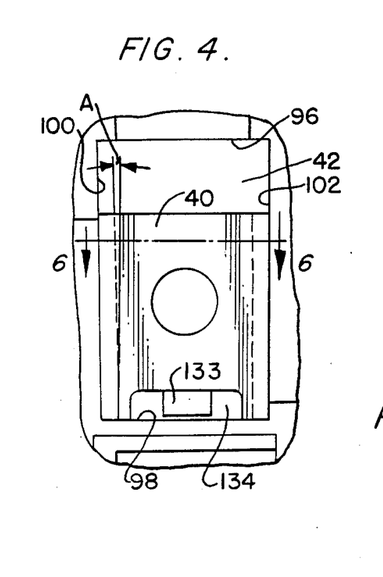
FIG. 4 is a fragmentary side elevation illustrating one side of the roller support shown in FIG. 2 with components positioned as formed.
Figures 5, 6:
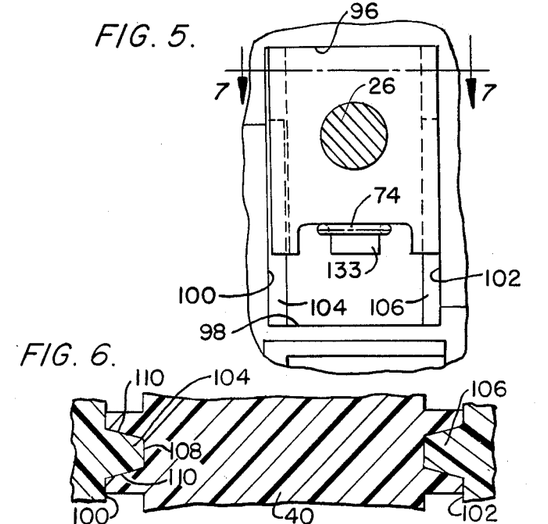
FIG. 5 is a fragmentary side elevation showing the components of FIG. 4 in a working inter-relationship.
FIGS. 6 and 7 are enlarged fragmentary cross-sections on lines 6—6 and 7—7 of FIGS. 4 and 5, respectively.
Figure 7:
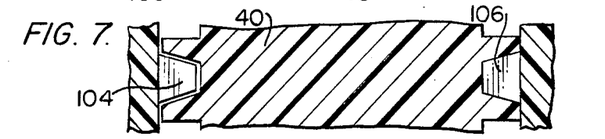
Figure 11:
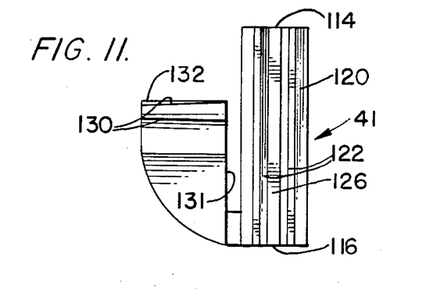
FIG. 11 is a side view of the bearing block shown in FIG. 10.
Figure 12:
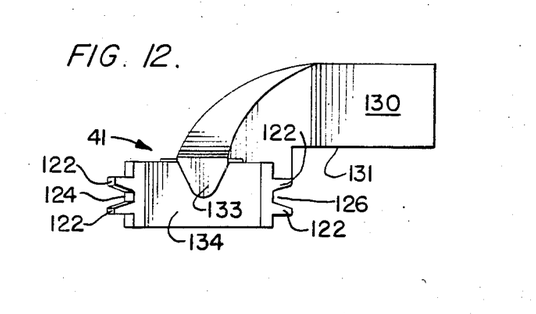
FIG. 12 is a bottom plan view of the bearing block shown in FIG. 10.

The configuration of the sliding bearing blocks 40 and 41 present identical mirror images, the outboard side of the slidable block 40 being shown in FIGS. 4 and 5 whereas the inboard side, front end and bottom of the sliding bearing block 41 on the non-gear assembly 16 are shown orthographically in FIGS. 10-12 of the drawings. Additionally, the cross-sectional illustrations in FIGS. 6 and 7 are applicable to both slidable bearing blocks 40 and 41. As shown in FIGS. 10-12, the sliding block 41 includes a plate-like body portion 112 in which the bearing aperture 32 is centrally located. The body portion 112 complements precisely the configuration of the slide windows 42 and 43 in the support plates 36 and 38 in the area of the window circumscribed by the end edge 98, the side edges 102, nd a plane defining the top edges of the guide rails 106 and 108. As such, the body portion of each sliding bearing block 40 and 41 includes parallel top and bottom edges 114 and 116 and a pair of side edges 118 and 120 which diverge at the angle A in the direction proceeding from the bottom edge 116 to the top edge 114. Projecting from each side edge 118 and 120 are a pair of flanges 122 of a configuration to define trapezoidal grooves 124 and 126 along the respective side edges 118 and 120. Because the grooves 124 and 126 are formed by the guide rails 104 and 106 in the slide windows 42 and 43 in a manner to be described below, they complement precisely the exterior configuration of the guide rails.

Projecting from the inboard side of each of the sliding bearing blocks 40 and 41 is a forwardly and upwardly inclined arcuate formation 128. As shown in FIG. 10, the opposite surfaces 130 of the formation 128 which project from the inboard face of the body portion 112 converge outwardly to provide mold draft. Also, an inner side surface 131 of the formation 128 is spaced from the inboard surfaces of the body portion 112 as shown in FIGS. 11 and 12. A ridge-like surface 132 near the tip of the formation, however, is oriented in a precisely perpendicular relationship to the inboard surface of the body 112 as well as to the axis of the grooves 124 and 126. The formation 128 is provided as a film engaging component of the spread roller assembly described in the aforementioned U.S. Pat. No. 4,253,757. The ridge 132, therefore, will lie parallel to the axis of the rollers 10 and 12 and also of the film unit passed between those rollers.

As shown in FIG. 12, the formation 128 terminates at the bottom edge 116 of the body portion 112 of the sliding bearing block 41 which includes a central land 133 defined by a generally U-shaped spring receiving recess 134 in the bottom of the body portion 112. As may be seen in FIG. 5, for example, the central bight section of the spring is adapted to lie in the recess 134 about the land formation 133.

Figure 8:
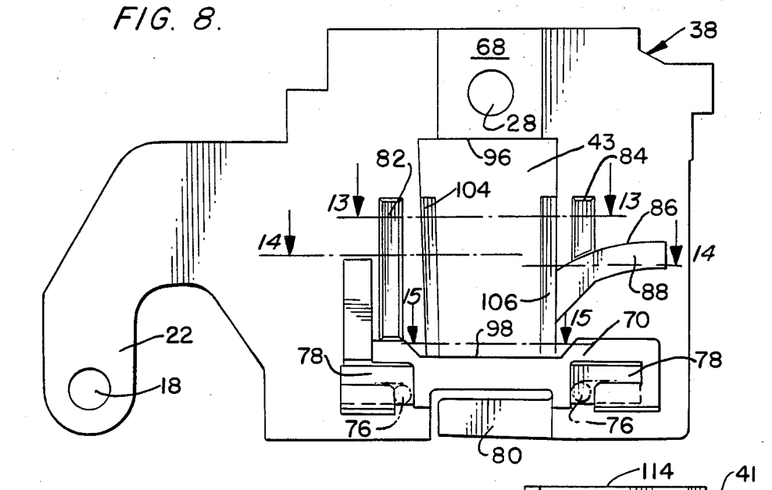
FIG. 8 is a side elevation illustrating one side of a support plate of the invention.

The method of forming each of the support assemblies 14 and 16 is essentially the same, apart from specific mold cavity configurations, and will be described with reference to FIGS. 3 and 13-15 of the drawings which illustrate mold fragments applicable to the region of the slide windows 42 and 43 in the respective support plates 36 and 38. In forming the non-gear side assembly 16, therefore, the plate member 38 is first molded by injecting a first plastic material into a first mold cavity which, though not illustrated in the drawings, will be of a shape to define the shape of the plate member 38 as it is shown in FIGS. 8, 9, and 13, for example. The first plastic material used to form the plates 36 and 38 is preferably a glass filled polyester having a melting temperature approximating 500° F. Examples of commercially available resins which may be used for the first plastic material include polyesters supplied by LNP Corporation, Malvern, Pennsylvania under the designation WFL-4536 (a 30% glass filled polyester with 15% polytetrafluoroethylene and 2% silicon): WFL-4416 (a 30% glass filled polyester with 2% silicon): and WFL-4418 (a 40% glass filled polyester with 2% silicon) and by Celenese Plastics Company of Chatham, New Jersey, a 30% glass filled polyester under the designation Celenex 3300. The Teflon and silicon content of such polyesters, where indicated, are desirable for lubricating characteristics whereas the glass fill is provided for strength and reduced molding shrinkage.

During injection of the first plastic or polyester, the temperature is controlled to provide a very small differential between the injection temperature and the melting temperature of the polyester. High molding pressures on the order of 15,000 psi are used. The combination of the small temperature differential and the high injection pressures contribute to the formation of a strong, shrinkage resistant plate which solidifies substantially instantaneously on mold cavity filling.

The plate member thus formed is then enclosed in a multi-part steel mold, exemplary parts of which are designated in the drawings by the reference numerals 136 and 138. As may be seen in FIGS. 3, 14 and 15, the mold parts 136 and 138 define with the side edges 100 and 102 and bottom edge 98 of the slide window 43 as well as the flat 88 on the arcuate projection 86, a second mold cavity defining the configuration of the sliding bearing block 41. As may be seen in FIG. 3, the mold part 138 is provided with a rectangular die formation 142 adapted to fill the slide window 43 above the guide rails 104 and 106. In addition, the mold part 138 includes a pair of ribs 144 and 146 as well as a U-shaped die formation 148 located to define the spring cavity 134 at the bottom of the sliding bearing block 41. The rib formations 144 and 146 register with the rectangular recesses 90 and 92 on the outboard side of the plate member 38. The mold part 136 is similarly formed with rib formations 150 and 152 (FIG. 14) to engage in the rectangular recesses 82 and 84 on the inboard side of the plate 38. In this way, the peripheral edges of the window 43 will be positively seized and retained by the steel mold part 136 and 138. It is noted further in this respect that in molding the gear side support assembly 14, the flange 62 and complementing mold cavity (not shown) serves a window retaining function. Similarly, the flange formations at the bottom edge of each window prevent distortion in that region.

Figure 15:
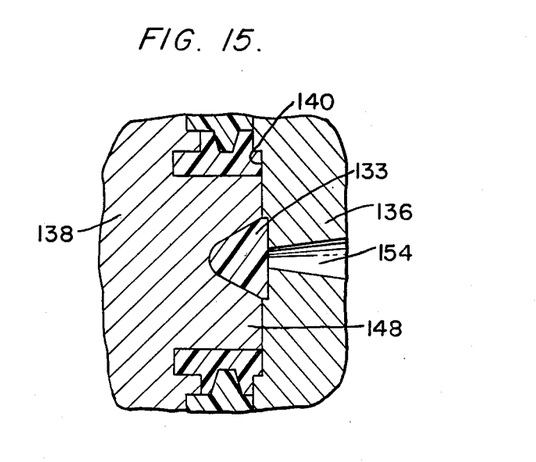
FIG. 15 is an enlarged fragmentary cross-section similar to FIG. 14 but on line 15—15 of FIG. 8.

As may be seen in FIGS. 3 and 15, the second mold cavity 140 is gated in the mold part 136 by a mold gate 154 located so that as a second plastic material is injected into the cavity 140, it passes between the legs of the U-shaped die formation 148 on first entering the cavity 140. By gating the second mold cavity in this way, the second plastic material first contacts the steel formation 148 which operates as a heat sink to cool the second plastic during injection into the mold cavity 140. In addition, such a gating arrangement avoids direct impingement of the second plastic against the surfaces of the previously molded plate member 38.

The second plastic material is preferably a glass filled acetal having a melting temperature of approximately 400° F. Acetals available commercially and which are acceptable for the sliding bearing blocks include KFL-4536 (a 30% glass filled acetal having 15% polytetrafluoroethylene and 2% silicon) and KFL-4416 (a 30% glass filled acetal having a 2% silicon content), both of which are available from LNP Corporation; Celcon GC-25 (a 25% glass coupled acetal) from Celenese Plastics Company; and Delrin 500 CL (a 20% glass filled acetal) available from E. I. Dupont Company.

The second plastic is injected into the mold cavity 140 at a molding temperature having a larger temperature differential relative to the melting temperature of the second plastic. For example, if the melting temperature of the acetal is 400° F., it is injected at a temperature of approximately 410° F. to 415° F. Also the second plastic is injected at relatively low injection pressures such as approximately 500 psi. As a result of the injection temperature differential relative to the melting temperature of the acetal and the relatively low pressures, higher shrinkage results on cooling of the second plastic than would occur if a smaller temperature differential were used. Also, because the temperature of the second plastic is always lower than the first plastic material, no damage to the first plastic material occurs.

The assembly of the slidable bearing blocks 40, 41 with the support plates 36, 38 on removal of the assembly from the mold parts 136 and 138 is as shown in FIGS. 4 and 6 of the drawings. Specifically, the bearing block 40 is shown against the bottom edge 98 of the slide window 42 and, as shown in FIG. 6, the adjacent surfaces of the guide rails 104 and 106 as well as the grooves 124 and 126 of the bearing block 40 are in firm contact with each other. Because of the divergence of the side walls 100 and 102 at the angle A, however, slight upward movement of the slide 40 will result in a parting of the guide rail and guide groove surfaces. This condition is illustrated in FIG. 7 of the drawings. The angle A is selected in practice to be on the order of 1–3 degrees. This angle of divergence will allow for proper parting of the bearing block and the guide rails and will provide very smooth sliding movement of the bearing block in the region of the working position thereof which is illustrated generally in FIG. 5. The arrangement allows a spring force of approximately 4.8 pounds and results in extremely low hysteresis losses in movement of the slide during operation of the spread roller assembly.

Thus it will be seen that as a result of the present invention, an extremely effective support plate/slide assembly and method for its manufacture are provided by which the above mentioned objectives are completely fulfilled. Although the assembly is particularly intended for use in the illustrated spread roller assembly, it will be appreciated that the basic assembly and its method of manufacture will have application broadly to assemblies of the type in which a sliding member is received in a support. Also it will be apparent to those skilled in the art from the preceding description that modifications and/or changes may be made in the described embodiments without departure from the present invention. Accordingly, it is expressly intended that the foregoing description and accompanying drawings are illustrative of a preferred embodiment only, not limiting, and that the true spirit and scope of the present invention be determined by reference to the appended claims.

What is claimed is:

1. A slide bearing assembly, of a support and a slide bearing carried by the support for translational movement relative thereto, made by the process of:
    forming a support defining a slide opening having opposed side edge formations and end edges, respectively, with said side edge formations diverging slightly as they extend from one of said end edges to the other;
    molding a slide bearing within said slide opening adjoining its said one end edge with a pair of side edge formations complementing adjoining portions of said side edge formations of said opening and with a length less than the distance between said end edges such that the width of said slide bearing is substantially equal to the width of said opening adjoining its said one end edge, and
    advancing said slide bearing from its molded position adjoining said one end edge to a bearing position adjoining said other end edge where a sliding clearance is provided in accordance with the divergence of said side edge formations of said opening.

2. The invention of claim 1 wherein said side edge formations of said opening and said slide bearing are formed as complementary guide rails and grooves which retain said slide within said opening.

3. The invention of claim 1 wherein said support is formed with side edge formations comprising rails projecting from bases at side edges of said opening and with each of said rails having guide surfaces converging inwardly of aid opening to a rail edge, and said slide bearing is molded within said opening with the side edge formation of said slide forming grooves which complement said rails so as to retain said slide bearing within said opening.

4. The invention of claim 1 wherein said forming and molding steps comprise injecting a first plastic material into a first mold cavity to define said support, enclosing said support in a mold which defines, with portions of said opening, a second mold cavity adjoining said one end of said opening with a length within said slide opening of less than the distance between said end edges of said opening, and injecting a second plastic material into said second mold cavity to mold said slide bearing.

5. The invention of claim 4 including removing said support and slide assembly from said cavity following injecting of said second plastic material, and moving said slide bearing from the narrow end of said window adjoining said one end edge to its working position at the wider end of said window adjoining said other end edge.

6. A roller supporting subassembly for use in a film processing spread roller assembly having two juxtaposed rollers with one of the rollers being translatable with respect to the other and retained against the other under a yieldable bias to provide a roll nip pressure, said subassembly made by the process of:
    forming a plate-like support member having a fixed bearing to rotatably support an end of said other of said rollers and a slide window spaced from said fixed bearing, said slide window defining a pair of linear edge guides diverging from a narrow end to a wide end of said window
    molding a slidable bearing block, having a bearing to rotatably support an end of said one of the rollers, within the narrow end portion of said window with a length shorter than the distance between the ends of said window, and with a pair of side edge formations complementing adjoining portions of said linear guides such that the width of said bearing block is substantially equal to the width of said window adjoining its narrow end; and
    advancing said bearing block from its molded position to a bearing position adjoining said wide end of said window where a sliding clearance is provided in accordance with the divergence of said edge guides.

7. The invention recited in claim 6, including molding a film engaging formation projecting parallel to the rollers from one side of said bearing block and radially of the rollers past one of said side edge formations, and forming said support member with a mold flat formation thereon positioned and dimensioned to underlie one edge of said film engaging formation when said bearing block is molded within the narrow end of said window and to be spaced from said film engaging formation when said bearing block is in its said working position near the wide end of said window.

8. The invention recited in claim 7 including forming said plate-like member with mold retention formations on opposite sides thereof and circumscribing only said narrow end with said linear guide edges.

9. A slide bearing assembly, of a support and a slide bearing carried movably by the support, made by the process of:
    injecting a first plastic material into a first mold cavity to form said support in a configuration defining a slide opening having opposed side and end edges, respectively, and a pair of guides extending along said side edges from one of said end edges and diverging in the direction of the other of said end edges;
    enclosing said support in a mold shaped to complement said support and to define with at least said guides and said one end edge of said slide opening, a second mold cavity having a length less than the distance between said end edges of said slide opening;
    injecting a second plastic material into said second mold cavity to form said slide bearing with a width substantially equal to the width of said slide opening adjoining said one end edge;
    removing said mold which defines said second mold cavity from said support and slide bearing; and
    advancing said slide bearing from its molded position to a bearing position adjoining said other end edge where a sliding clearance is provided in accordance with the divergence of said side edges of said opening.

10. The invention recited in claim 9, wherein said first plastic material has a melting temperature higher than the melting temperature of said second plastic material and wherein said first plastic material is injected under relatively high molding pressures at temperatures slightly in excess of the first plastic material melting temperature.

11. The invention recited in claim 10, wherein said second plastic material is injected under relatively low molding pressures and at temperatures substantially above the melting temperature thereof but lower than the melting temperature of said first plastic material.

12. The invention recited in claim 9, including the step of retaining the edges of said slide opening by said mold during injection of said second plastic material.

* * * * *